United States Patent [19]

Willis et al.

[11] Patent Number: 5,205,999
[45] Date of Patent: Apr. 27, 1993

[54] ACTINIDE DISSOLUTION

[75] Inventors: John S. Willis, Prescot; David A. White, London, both of England

[73] Assignee: British Nuclear Fuels plc, Warrington, England

[21] Appl. No.: 761,060

[22] Filed: Sep. 18, 1991

[51] Int. Cl.⁵ .............................................. B01F 1/00
[52] U.S. Cl. ....................................... 423/20; 423/6; 423/251; 423/252; 423/253; 210/759; 210/760; 134/2; 134/26
[58] Field of Search ................. 252/626; 423/249, 17, 423/16, 18, 20, 251, 252, 253; 210/759, 760; 134/2, 25.1, 26, 41; 588/251

[56] References Cited

U.S. PATENT DOCUMENTS

| | | | |
|---|---|---|---|
| 2,896,930 | 7/1959 | Menke | 299/5 |
| 2,979,378 | 4/1961 | Koble | 423/17 |
| 3,013,909 | 12/1961 | Pancer et al. | 134/3 |
| 3,080,262 | 3/1963 | Newman | 134/3 |
| 3,130,960 | 4/1964 | Martin | 299/5 |
| 3,297,580 | 1/1967 | Pitzer | 252/142 |
| 3,496,017 | 2/1970 | Weed | 376/309 |
| 3,615,817 | 10/1971 | Jordan | 134/3 |
| 3,778,497 | 11/1973 | Deaton et al. | 423/2 |
| 3,873,362 | 3/1975 | Mihram et al. | 134/3 |
| 4,226,640 | 10/1980 | Bertholdt | 134/3 |
| 4,452,490 | 6/1984 | Yan | 299/4 |
| 4,575,154 | 3/1986 | Mays | 299/4 |
| 4,690,782 | 9/1987 | Lemmens | 252/626 |
| 4,704,235 | 11/1987 | Arvesen | 252/626 |
| 4,705,573 | 11/1987 | Wood et al. | 134/3 |
| 4,729,855 | 3/1988 | Murray et al. | 252/626 |
| 4,731,124 | 3/1988 | Bradbury et al. | 134/3 |
| 4,783,253 | 11/1988 | Ayres et al. | 209/2 |
| 4,830,738 | 5/1989 | White et al. | 209/166 |
| 4,942,594 | 7/1990 | Bertholdt et al. | 376/310 |
| 5,008,044 | 4/1991 | Hanulik | 252/628 |
| 5,045,240 | 9/1991 | Skriba et al. | 252/626 |
| 5,085,709 | 2/1992 | Morris et al. | 134/3 |

OTHER PUBLICATIONS

Bradbury, "Development of Chemical Methods of Radioactive Waste Management for UK Power Reactor Sites", CEGB, pp. 377-380.

Bradbury, "Magnox Dissolution in Carbonated Water. A Method for the Separation and Disposal of Magnox from Fuel Element Debris Waste", Water Chemistry 3, BNES, London, 1985, pp. 345-352.

Paper entitled, "Disposal of Radioactive Decontamination Solution Wastes", Prepared by IMPELL Corporation, Walnut Creek, Calif. and EAL Corporation, Richmond, Calif., pp. cover page, iii, iv, v, vii, viii, ix, B-12 and B-13, Sep. 1984, Palo Alto, Calif.

Primary Examiner—Donald P. Walsh
Assistant Examiner—Ngoclan T. Mai
Attorney, Agent, or Firm—William R. Hinds

[57] ABSTRACT

A process for the treatment of a material which is or is suspected to contain or carry one or more actinides or compounds thereof to dissolve such actinides or compounds comprises contacting the material with an aqueous solution having a pH in the range 5.5 to 10.5 which is free of heavy metal ions and comprises ingredients which are naturally degradable to non-toxic products with or without mild physical assistance such as heat or ultra-violet radiation, said solution comprising:

(a) carbonated water;
(b) a conditioning agent;
and (c) a complexing agent which comprises the anion of a carboxylic acid having from 2 to 6 carbon atoms.

The process may be employed to separate spent nuclear fuel from its metal containment or it may be employed to decontaminate surface, e.g. concrete or soil or pipes carrying traces of actinides, or bulk materials such as soil or rubble.

13 Claims, No Drawings

ACTINIDE DISSOLUTION

The present invention relates to the dissolution of actinides and is suitable particularly for the treatment of soil contaminated with contaminants comprising plutonium or a compound of plutonium with or without other actinides or compounds thereof.

The purpose of the present invention is to provide a process for the dissolution of actinides, i.e. elements having periodic numbers in the range 89 to 104, and which is applicable to materials such as concretes and soils which are or are suspected to be contaminated with such elements and compounds. Desirably, the actinides can be recovered after dissolution.

A known method of treating materials contaminated with actinides is to wash them with nitric acid. However, nitric acid is not preferred because it can degrade certain important structural materials, e.g. concrete, and may leach excessive quantities of inactive elements thereby making the selective recovery of actinides difficult.

Another known method involves the use of oxalates, gluconates and hydrogen peroxide. However, this solution requires high concentrations of the reagents which limits the market for its application and requires direct solidification of the liquid waste produced without any recovery of the actinides. The volumes of waste produced are excessive.

A further known method (EP 0282810) which has been proposed specifically for the direct treatment of spent nuclear fuels employs an aqueous bicarbonate solvent with or without an oxidising solvent assistant, the preferred assistant being cerium salts. As well as presenting the problem of removing cerium from the used solvent (or introducing cerium itself as a contaminant) this known process does not dissolve certain actinides other than uranium and plutonium and certain lanthanides which may be present as fission products.

According to the present invention, a process for the treatment of soil contaminated with contaminants comprising plutonium or a compound of plutonium with or without other actinides or compounds thereof comprises removing the contaminated soil from the site of the contamination, transporting the soil to a treatment site and at the treatment site contacting the material with an aqueous solution having a pH in the range 5.5 to 10.5 which is non-toxic, free of heavy metal ions and comprises ingredients which are naturally degradable to non-toxic products with or without mild physical assistance, the solution comprising:
(a) carbonated water;
(b) a conditioning agent, and
(c) a complexing agent which comprises the anion of a simple carboxylic acid having from 2 to 6 carbon atoms,
and thereby dissolving the contaminants as actinide complexes in the solution to decontaminate the soil.

The said solution may also advantageously dissolve fission products associated with spent nuclear fuel. The term fission product as used herein refers to those elements formed as products (or so-called 'fission fragments') in the fission of nuclear fuel.

The process according to the present invention provides a method of selectively dissolving actinides under mild chemical conditions in order to decontaminate solid substances such as concrete, soil and rubble. The dissolved actinides can be recovered from the resulting solution which can then be recycled. The process may also be used to treat radioactive waste, e.g. sludges, to convert the waste to a lower radioactive level, e.g. intermediate to low level.

The actinide(s) to be dissolved may particularly comprise plutonium or a plutonium-containing mixture of actinides. The actinide(s) may also comprise uranium. The actinide may be derived from nuclear fuel and in particular irradiated nuclear fuel, and may comprise a compound of the actinide or actinides such as an oxide, hydroxide or carbonate.

The pH of the said aqueous solution may be controlled using carbon dioxide dissolved in the solution and/or a carbonate such as sodium carbonate to provide the carbonated solution.

Desirably, the said process is one which may be carried out at a temperature of less than 35° C. and which gives no toxic or explosive off gases.

Desirably, the said solution contains no ingredients, e.g. nitrates or sulphates, which will damage building materials, e.g. concrete, in which the material to be treated might be contained or promote a runaway reaction with uncorroded metals, e.g. any magnesium present.

The actinide(s) and fission product(s) may dissolve in the aqueous medium as a carbonate compound or complex.

The complexing agent may be selected from the anion of a carboxylic acid in the group consisting of citric acid, acetic acid, oxalic acid and EDTA (ethylenediamine tetracetic acid).

The conditioning agent may comprise an oxidising agent such as hydrogen peroxide, ozone, oxygen-enriched air or potassium permanganate, or a reducing agent such as hydrazine or hydroxylamine.

The actinide or fission product to be dissolved may be present or suspected to be present on a surface of a component, such as a concrete component, or may be present or suspected to be present in bulk material such as soil or earth or rubble which is or is believed to be contaminated or radioactive waste which is to be converted to a lower activity level.

The actinide or fission product may be present in a medium based on a metal, e.g. magnesium hydroxide, and the method used to dissolve the actinide and said medium. For example, the actinide may comprise plutonium dioxide and/or uranium dioxide, the medium may comprise an alloy known as Magnox (a family of magnesium alloys containing traces of aluminium, manganese and zirconium) and its corrosion products (mainly magnesium hydroxide), and carbon dioxide used to control the pH so that magnesium is dissolved as its bicarbonate.

Desirably, the complexing agent is present in the said solution in a concentration in the range from 0.0001 to 5 Mol $dm^{-3}$, especially 0.005 to 0.05 Mol $dm^{-3}$.

Desirably, the said conditioning agent is present in the said solution in a concentration in the range from 0.01 Molar to 3 Molar.

It is believed that the conditioning agent changes the oxidation state of the actinide (or fission product) to a state which renders the actinide (or fission product) soluble by forming a complex with the complexing agent or by the natural solubility of the conditioned cation in the leaching solution. The complex produced by the complexing agent and the actinide (or fission product) may facilitate the oxidation or reduction carried out by the conditioning agent.

Embodiments of, or related to, the present invention will now be described, by way of example only, with reference to the following examples.

One type of fuel used in nuclear reactors comprises uranium metal which is housed within a metallic sheath typically made from Magnox (a magnesium alloy containing traces of aluminium, manganese and zirconium). When the irradiated fuel is removed from the nuclear reactor it is first allowed to cool and then separated from the Magnox sheath. The Magnox sheath and any fragments of irradiated nuclear fuel associated with the sheath are stored under water in concrete containers. Corrosion of the Magnox during prolonged storage gives a sludge containing Magnox metal, magnesium hydroxide, uranium dioxide and products generated in the irradiation of the fuel, e.g. plutonium dioxide, americium and fission products.

An aqueous suspension of the sludge was stirred, carbon dioxide gas passed into the sludge, and solutions of sodium citrate (0.01 to 0.05M) and of hydrogen peroxide (0.02M) added. A solution was obtained which was sent for further processing, such as ion exchange. Passage of carbon dioxide into the sludge provides bicarbonate ions and magnesium is dissolved as magnesium bicarbonate. Following dissolution of the sludge the magnesium can be removed from solution by heating when the soluble bicarbonate is converted to insoluble carbonate. Other actinides, such as americium and neptunium, also dissolve in the carbon dioxide sparged aqueous solution containing the peroxide and citrate ions.

It is thought that the citrate and insoluble plutonium form a soluble plutonium complex, and that the presence of the citrate may facilitate the oxidation of the plutonium by the hydrogen paroxide to a more soluble oxidation state, such as plutonium (VI). A similar mechanism may operate with uranium and may assist the reduction of, for example, insoluble plutonium (IV) to soluble plutonium (III).

Since the dissolution is carried out at pH's above 5.5 and can be carried out at about neutral pH components such as concrete are not attacked. This contrasts with the usual methods of dissolving nuclear fuel which employ nitric acid—a reagent which attacks concrete.

The method of dissolution can be used to decontaminate components by immersing the components in an aqueous solution and passing carbon dioxide through the solution and adding citrate and hydrogen peroxide. To reduce loss of carbon dioxide from such a system it is advantageous to carry out the dissolution in a closed vessel or to re-circulate the carbon dioxide. Alternatively the surface to be decontaminated can be contacted with a solution of hydrogen peroxide, sodium citrate and sodium carbonate by, for example, spraying the solution onto the surface.

When decontaminating concrete surfaces it is advantageous to employ sodium carbonate in place of carbon dioxide as a pH of about 10 can be maintained which reduces the amounts of salts present which can corrode the concrete.

In another example soil contaminated with actinides and fission products may be treated to recover the actinides and fission products as follows. Firstly, contaminated soil is separated from uncontaminated soil and is boxed and transported to a treatment site. At the treatment site a solution comprising water saturated with carbon dioxide, sodium citrate (0.05M concentration as a typical example) and $H_2O_2$ (0.9M as a typical example) is continuously sprayed at ambient temperature over the top surface of the soil and is allowed to percolate through the soil to a collecting trough below, where it is collected and transferred to an ion exchange plant where the actinide complexes are held. The actinides can subsequently be recovered from the resin in a known way, e.g. by addition of a solution of nitric acid which redissolves the captured actinides.

In a further comparative example in order to demonstrate the effect of the combination of the ingredients in a three-component solution as defined above in a process embodying the present invention samples of a sludge containing solid actinide contaminants were treated in turn in a glove box with samples of three test solutions as follows:

Solution A: an aqueous solution containing 0.005M sodium citrate; 0.89M $H_2O_2$ and carbon dioxide bubbled into the solution to saturation;

Solution B: an aqueous solution containing 0.005M sodium citrate; plus carbon dioxide bubbled in the solution to saturation;

Solution C: an aqueous solution containing 0.89M $H_2O_2$ plus carbon dioxide bubbled into the solution to saturation.

After contact of the sludge sample with Solution A at ambient temperature for 72 hours the following percentages of uranium, plutonium, americium, magnesium antimony and caesium (all present in the original sludge) were found to have been dissolved by the solution: 98, 93, 87, 100, 100, 99 respectively (all percentages may be raised to 100 by increasing the contact time and/or the citrate concentration).

After contact of the sludge sample with Solution B at ambient temperature for 72 hours the dissolution percentages of U, Pu, Am, Mg, Sb and Cs were found to be 70, 62, 76, 100, 94, 62 respectively.

After contact of the sludge sample with Solution C at ambient temperature for 72 hours the dissolution percentages of U, Pu, Am, Mg, Sb and Cs were found to be 56, 22, 53, 92, 94, 83 respectively.

This demonstrates the surprising effectiveness of the three part citrate/$H_2O_2$/$CO_2$ solution as compared with solutions containing only two out of three of these ingredients.

The process according to the present invention advantageously uses inexpensive chemicals at low concentrations and selectively dissolves actinides from contaminated surfaces and materials. The process is compatible with most building materials and does not cause structural damage. It can be used to recover actinides as well as dissolving them.

We claim:

1. A process for the treatment of soil contaminated with contaminants comprising plutonium or a compound of plutonium with or without other actinides or compounds thereof which process comprises removing the contaminated soil from the site of the contamination, transporting the soil to a treatment site and at the treatment site contacting the material with an aqueous solution having a pH in the range 5.5 to 10.5 which is non-toxic, free of heavy metal ions and comprises ingredients which are naturally degradable to non-toxic products with or without mild physical assistance, said solution comprising:

(a) carbonated water;

(b) a conditioning agent, and (c) a complexing agent which comprises the anion of a simple carboxylic acid having from 2 to 6 carbon atoms, and thereby dissolving said contaminants as actinide complexes in said solution to decontaminate said soil.

2. A process as in claim 1 and wherein the actinide complexes dissolved in the said solution are subsequently recovered from the said solution.

3. A process as in claim 2 and wherein said actinide complexes are recovered from said solution in an ion exchange plant.

4. A process as in claim 1 and wherein the conditioning agent is selected from hydrogen peroxide, ozone, oxygen-enriched air, potassium permanganate, hydrazine and hydroxlamine.

5. A process as in claim 4 and wherein the conditioning agent is present in said solution in a concentration of from 0.01M to 3M.

6. A process as in claim 1 and wherein the complexing agent is an anion selected from acetate, citrate and oxalate.

7. A process as in claim 6 and wherein the complexing agent is present in said solution in a concentration of from 0.0001M to 5M.

8. A process as in claim 1 and wherein said complexing agent comprises citrate present in said solution in a concentration in the range of from 0.005 to 0.5M and the conditioning agent comprises hydrogen peroxide present in said solution in a concentration in the range of from 0.01M to 3M.

9. A process as claimed in claim 1 wherein the complexing agent is selected from the anion of a carboxylic acid in the group consisting of citric acid, acetic acid, oxalic acid, and EDTA.

10. A process as claimed in claim 2 wherein the complexing agent is selected from the anion of a carboxylic acid in the group consisting of citric acid, acetic acid, oxalic acid, and EDTA.

11. A process as claimed in claim 3 wherein the complexing agent is selected from the anion of a carboxylic acid in the group consisting of citric acid, acetic acid, oxalic acid, and EDTA.

12. A process as claimed in claim 4 wherein the complexing agent is selected from the anion of a carboxylic acid in the group consisting of citric acid, acetic acid, oxalic acid, and EDTA.

13. A process as claimed in claim 5 wherein the complexing agent is selected from the anion of a carboxylic acid in the group consisting of citric acid, acetic acid, oxalic acid, and EDTA.

* * * * *